J. J. DETTLING AND E. A. TINSMAN.
METHOD OF PRODUCING LEGGINGS.
APPLICATION FILED APR. 15, 1918.

1,309,118.

Patented July 8, 1919.
2 SHEETS—SHEET 1.

ply of fabric
friction
ply of fabric

Witness
Geo. E. Knicker.

Inventors
J. J. DETTLING.
E. A. TINSMAN.

By
Attorneys

J. J. DETTLING AND E. A. TINSMAN.
METHOD OF PRODUCING LEGGINGS.
APPLICATION FILED APR. 15, 1918.
1,309,118.
Patented July 8, 1919.
2 SHEETS—SHEET 2.
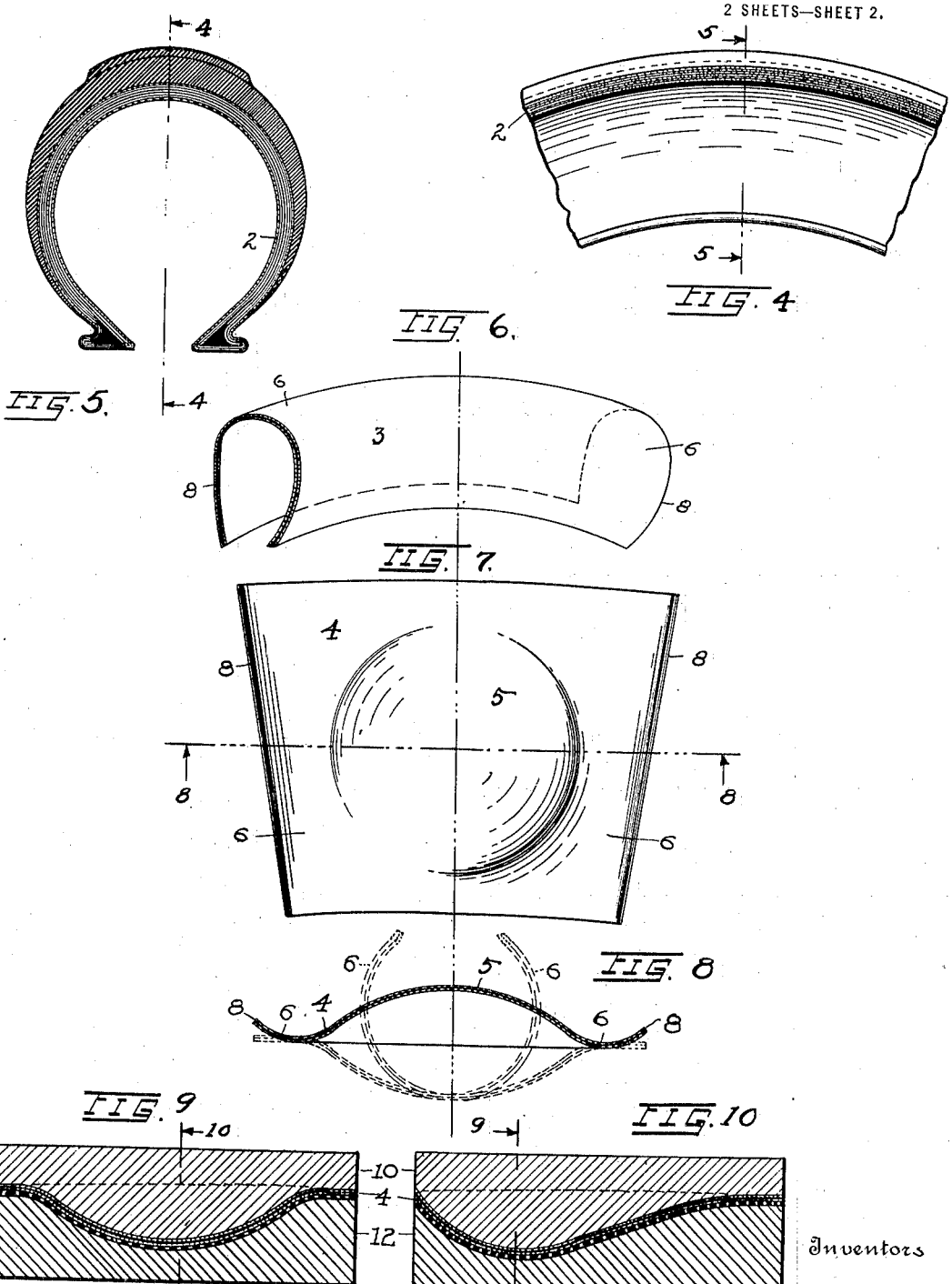
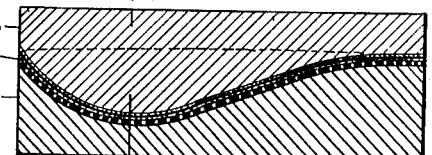
Inventors
J. J. DETTLING.
E. A. TINSMAN.
Witness
Geo. E. Kricker.
By
Attorneys

UNITED STATES PATENT OFFICE.

JOSEPH J. DETTLING AND EDGAR A. TINSMAN, OF AKRON, OHIO.

METHOD OF PRODUCING LEGGINGS.

1,309,118.   Specification of Letters Patent.   Patented July 8, 1919.

Application filed April 15, 1918. Serial No. 228,640.

*To all whom it may concern:*

Be it known that we, JOSEPH J. DETTLING and EDGAR A. TINSMAN, citizens of the United States, residing at Akron, in the county of Summit and State of Ohio, have invented certain new and useful Improvements in Methods of Producing Leggings, of which the following is a specification.

This invention relates to a method of producing a shapely and serviceable legging for military and other uses, and in general the steps involved consist in sub-dividing the carcass of an automobile tire to provide segmental blanks of a given thickness and of a predetermined size and shape, and in reshaping these blanks and molding and curing a rubber facing on the blanks.

The carcass of a pneumatic tire is usually built up of separate plies of frictioned fabric and its shape is approximately that of an annular tube which is curved or rounded transversely. Our object is to utilize this frictioned fabric as preformed and produce a military legging, and a decided advantage is gained by such use in that old tires, which are no longer fit for road use, may be converted into leggings at a relatively low cost, and in that a sectional part of a tire carcass, when buckled transversely to its larger line of curvature, will conform approximately to a human leg between the knee and the ankle and require very little reshaping to make an absolutely accurate fit and shapely appearance.

Figure 1:
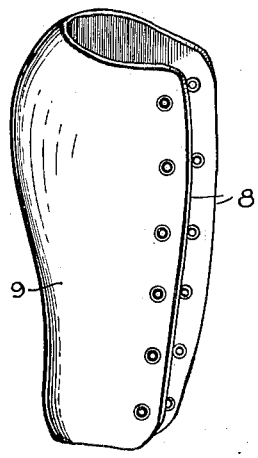
Figure 2:
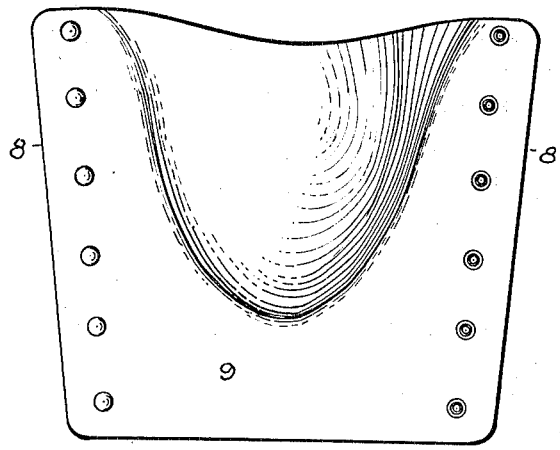
Figure 3:
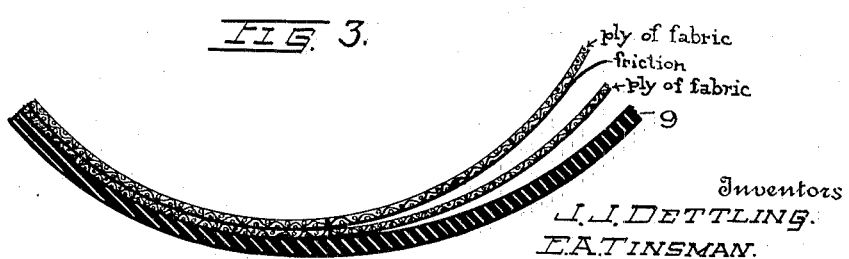

Now having reference to the accompanying drawings, Figure 1 is a perspective view of a legging as it appears partly folded for use. Fig. 2 is a face view of a legging unfolded to show its shape and outlines. Fig. 3 is a cross section of a portion of the legging showing two plies of fabric with a heavy coating of rubber. Figs. 4 to 10, inclusive, illustrate the tire, blanks, and molds as they appear and are used at different stages of operations.

Thus, in practising the method, the first step is to separate plies of fabric in the tire carcass 2 by a stripping operation involving two plies at a time and without disturbing the union of rubber between the two plies. The beaded portions of the tire are also removed. Such double-ply strips are then cut into suitable lengths and on diverging lines transversely of the strip. When so cut, the strip 3 naturally curls to the conformation possessed by it originally (see Fig. 6) and when an attempt is made to flatten it out a blank 4 is obtained having the irregular curvature and outline shown in Fig. 7. Going a step farther and applying pressure to the blank downwardly against the raised rounded middle portion 5 thereof, a peculiar effect is produced, to wit;—that of buckling the middle portion and curling the end portions 6 upwardly and inwardly into a roll or tube having its axis at right angles to the line of major curvature of the curved strip as originally received and taken from the tire. In effect, the rounded bulge 5 is inverted, and the diverging straight edges 8 of the blank are placed opposite each other on substantially parallel lines, and this article, without further change, makes a fairly good fitting legging. But a better fit and a fixed and more shapely appearance is given and the body is also strengthened and protected and made water tight by cementing a facing of raw rubber 9 upon the outside of the turned fabric and then molding and vulcanizing this product. That is, the rubber-faced product is placed between two mold sections 10 and 12 having matching surfaces of irregular curvature, and pressure and heat is applied thereto for a predetermined time until vulcanization takes place. Openings are then punched at spaced intervals through the flap portions 6 of the legging, and either snap locks or gromets affixed in said openings, thereby completing the article for sale and use.

What we claim is:

1. A method of producing a legging, consisting in stripping the built-up plies of fabric of a tire carcass from each other and reshaping segmental portions thereof with the addition of rubber into a legging of fixed shape and outline.

2. A method of producing a legging, consisting in stripping the plies of fabric of a tire carcass from each other and folding a section thereof transversely to the line of its major curvature and vulcanizing a rubber facing thereto.

3. A method of producing a legging, consisting in stripping the plies of fabric of a tire carcass from each other; cutting the separated plies into segmental blanks; recurving the blanks on a line transversely to the major curvature of the segment; and vulcanizing a rubber facing to the outer side of each recurved blank.

4. A method of producing a legging, consisting in stripping and sub-dividing the separate plies of a tire carcass into blanks of quadrilateral shape; buckling the blank transversely; adding a facing of rubber to the convex side of the buckled blank; and applying pressure and heat to the faced blank in a vulcanizing press.

5. A method of producing a legging, consisting in stripping a plural number of united plies of fabric from the carcass of a tire and reshaping quadrilateral portions thereof with the addition of rubber into a legging of fixed curvature and outline.

6. A method of producing a legging, consisting in stripping a plural number of united plies from a tire carcass having minor and major curvatures; in cutting the strips on diverging transverse lines relatively to the major line of curvature; in recurving the segments at right angles to their line of major curvature; and in vulcanizing a facing of rubber to the segments in a mold.

Signed at Barberton, in the county of Summit, and State of Ohio, this 8th day of April, 1918.

JOSEPH J. DETTLING.
EDGAR A. TINSMAN.